May 1, 1951  E. H. POLK  2,550,717
TURBINE DRIVEN COOLING FAN FOR AIR-COOLED ENGINES
Filed March 14, 1949  2 Sheets-Sheet 1

Inventor
EDWIN H. POLK

May 1, 1951　　　　　E. H. POLK　　　　　2,550,717
TURBINE DRIVEN COOLING FAN FOR AIR-COOLED ENGINES
Filed March 14, 1949　　　　　　　　　　2 Sheets-Sheet 2

Inventor
EDWIN H. POLK

Patented May 1, 1951

2,550,717

UNITED STATES PATENT OFFICE 2,550,717

TURBINE DRIVEN COOLING FAN FOR AIR-COOLED ENGINES

Edwin H. Polk, Silver Spring, Md.

Application March 14, 1949, Serial No. 81,380

3 Claims. (Cl. 60—13)

(Granted under the act of March 3, 1883, as amended April 30, 1928; 370 O. G. 757)

This invention relates generally to air-cooled aircraft engines and specifically to exhaust-gas driven turbines driving cooling fans and superchargers.

This application is a continuation-in-part of copending application Serial No. 546,032, which has matured into Patent No. 2,485,655, issued October 25, 1949.

In present day aircraft it is common to use turbines operated by the exhaust gases to drive superchargers for the carburetor intake, especially when altitude conditions require higher air pressures in the engine intake. The use of such superchargers at low level flight or during take-off is not desirable due to over-heating of the engine under takeoff load. At such times it is moreover desirable to provide for extra cooling of the engine, such as with a fan either fore or aft of the engine and within the cowling.

Therefore, it is an object of this invention to provide a fan for cooling the aircraft engine, and one which is driven by the turbine in the exhaust system.

A second object of the invention is to provide a supercharger driven by the same turbine using the exhaust gases as motive power.

Another object of the invention is to provide a system of clutches which operate to make it possible to selectively operate either the cooling fan or the supercharger.

Other objects and many of the attendant advantages of this invention will be readily appreciated as the same becomes better understood by reference to the following detailed description when considered in connection with the accompanying drawing in which reference numerals designate like parts throughout the figures thereof and wherein.

Figure 1:
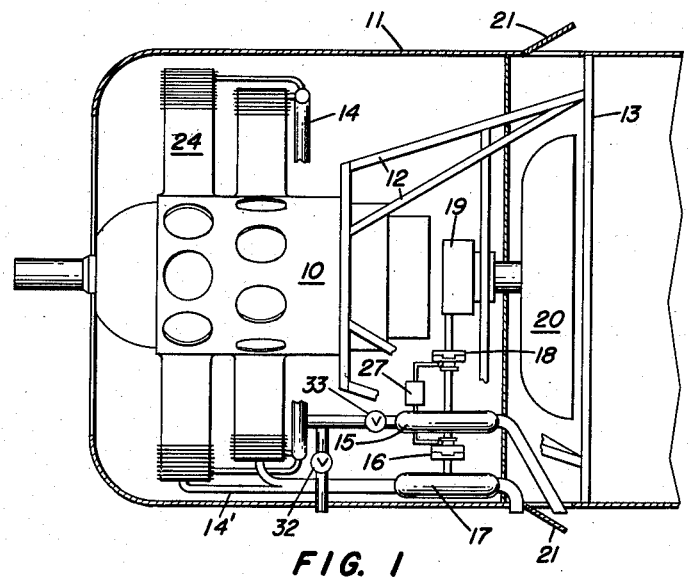
Fig. 1 shows a view in elevation of portions of an aircraft engine with the invention mounted thereon.

Referring more particularly to the drawing, in Fig. 1 a rotary type air-cooled aircraft engine 10 is positioned within a cowling 11 and secured by struts 12 to the aircraft frame indicated by portion 13. Exhaust gases from engine 10 are conveyed by collector ring 14 to turbine 15 and thence to the atmosphere. Turbine 15 is connected on one side to clutch 16 and supercharger 17 which supplies air through conduit 14' to the engine 10 for combustion purposes. On the other side, turbine 15 drives a second clutch 18, reduction gear 19, and cooling fan 20. The controls for the clutches 16 and 18 are mechanically connected together so as to alternatively connect the turbine to the supercharger 17 or cooling fan 20. Cowling 11 has ports 21 for discharging the cooling air to the slip-stream or the atmosphere.

Figure 2:
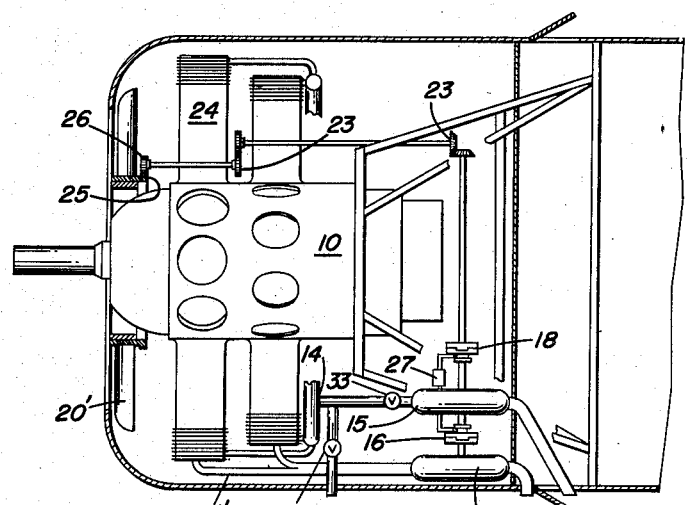
Fig. 2 shows a view in elevation of another embodiment of the invention.

In Fig. 2, the cooling fan 20' is shown forward of the engine and connected to clutch 18 by intermediate gearing 23 so placed as to avoid the staggered cylinders 24 of engine 10 and ring gear 25 with pinion gear 26 acting as a reduction gear, the cooling fan 20' is driven at a reduced speed relative to turbine 15.

Figure 3:
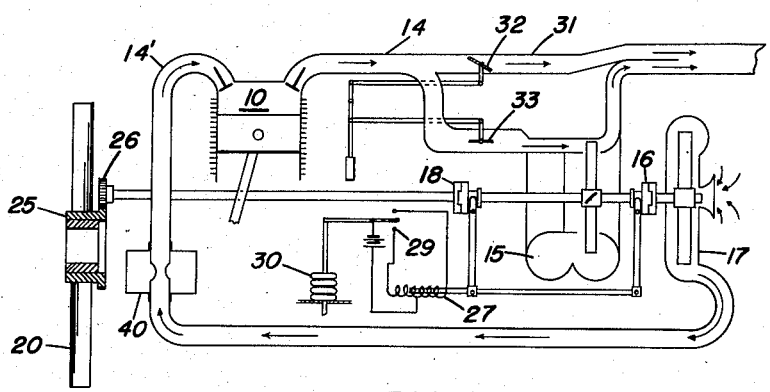
Fig. 3 shows a schematic view of the elements of the invention.

In Fig. 3, a schematic arrangement of the elements of the invention shows that the controls of clutches 16 and 18 are mechanically connected together to connect them alternatively and are operated by the double-ended solenoid 27 energized by battery 28 through the double-throw switch 29. A bellows 30 containing air or other fluid is responsive to air density changes and is connected to switch 29 so as to operate the controls for the clutches 16 and 18. The bellows 30 may be positioned in the manifold of the engine 10 or may be elsewhere in the aircraft and may be responsive to changes in barometric pressure or to changes in manifold pressures. Carburetor 40 is positioned in conduit 14' in the conventional manner. Collector ring 14 has a conventional by-pass 31 with valves 32 and 33 to control the flow of gases through the turbine. The valves 32 and 33 may be manually controlled to adjust the speed of the turbine 15 so that the speed of the turbine may be adjusted for optimum performance of the cooling fan 20 or 20' and the supercharger 17.

Figure 4:
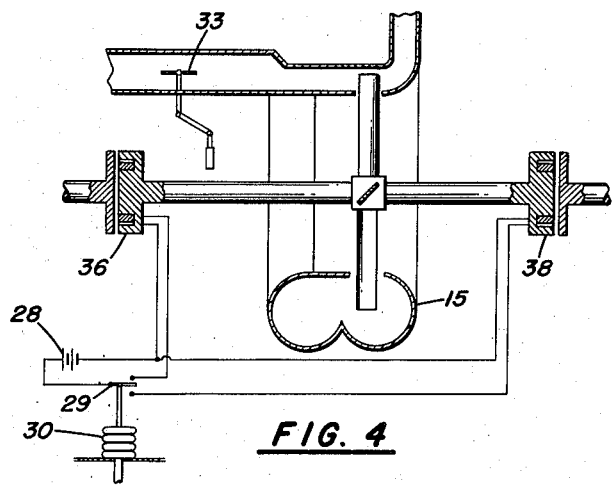
Fig. 4 shows a schematic view of another embodiment of the invention.

In Fig. 4 the clutches 36 and 38 are of the magnetic type and are energized directly by the battery 28 through the switch 29.

In operation, the switch 29 is adjusted automatically to engage the clutch 18 during take-off so that cooling air is supplied by fan 20 or 20' to the engine 10 and at a predetermined low altitude the switch is operated by the barometric bellows 30 to move the clutch control to disengage the fan 20 or 20' and at a predetermined high altitude to move the clutch control to engage the supercharger 17.

It should be understood, of course, that the foregoing disclosure relates to only a preferred embodiment of the invention and that numerous modifications or alterations may be made therein without departing from the spirit and scope of the invention as set forth in the appended claims.

The invention described herein may be manufactured and used by or for the Government of the United States of America for governmental purposes without the payment of any royalties thereon or therefor.

What is claimed is:

1. In an aircraft having an air-cooled engine, the combination of a turbine adapted to be driven by the exhaust gases from said engine, a fan for cooling said engine, a supercharger for supplying air to said engine, means to alternatively connect said fan or said supercharger to said turbine, and means responsive to air pressure to operate said first means.

2. In an aircraft having an air-cooled engine, the combination of a turbine adapted to be driven by the exhaust gases from said engine, a fan for cooling said engine, a supercharger for supplying air to said engine, clutch means to connect either said fan or said supercharger to said turbine, and means responsive to air pressure to actuate said clutch means.

3. In an aircraft having an air-cooled engine, the combination of a turbine adapted to be driven by the exhaust gases from said engine, a fan for cooling said engine, a supercharger for supplying air to said engine, clutch means to selectively engage either said fan or said supercharger to said turbine, means to adjust the speed of said turbine, and means responsive to air pressure to actuate said clutch means.

EDWIN H. POLK.

REFERENCES CITED

The following references are of record in the file of this patent:

UNITED STATES PATENTS

| Number | Name | Date |
|---|---|---|
| 1,279,128 | Lake | Sept. 17, 1918 |
| 2,057,517 | Finnegan | Oct. 13, 1936 |
| 2,485,655 | Polk | Oct. 25, 1949 |